United States Patent [19]
Foster

[11] Patent Number: 5,355,995
[45] Date of Patent: Oct. 18, 1994

[54] RECIPROCATING FLOOR CONVEYOR HAVING SEPARABLE FLOOR AND DRIVE PORTIONS

[76] Inventor: Raymond K. Foster, P.O. Box 1, Madras, Oreg. 97741

[21] Appl. No.: 136,295

[22] Filed: Oct. 14, 1993

[51] Int. Cl.⁵ .......................................... B65G 25/00
[52] U.S. Cl. ................................ 198/750; 414/525.1
[58] Field of Search .................... 198/750; 414/525.1

[56] References Cited

U.S. PATENT DOCUMENTS

| | | | |
|---|---|---|---|
| 2,401,465 | 6/1946 | Cwicig | 214/83 |
| 4,474,285 | 10/1984 | Foster | 198/750 |
| 4,492,303 | 1/1985 | Foster | 198/750 |
| 4,712,467 | 12/1987 | Foster | 91/176 |
| 4,785,929 | 11/1988 | Foster | 198/750 |
| 4,793,469 | 12/1988 | Foster | 198/750 |
| 4,821,868 | 4/1989 | Foster | 198/750 |
| 4,823,938 | 4/1989 | Foster | 198/750 |
| 4,899,870 | 2/1990 | Foster | 198/750 |
| 4,907,691 | 3/1990 | Foster | 198/750 |
| 4,966,275 | 10/1990 | Foster | 198/750 |
| 5,000,647 | 3/1991 | Foster | 414/525.9 |
| 5,092,732 | 3/1992 | Foster | 414/525.1 |

*Primary Examiner*—D. Glenn Dayoan
*Attorney, Agent, or Firm*—David P. Campbell

[57] ABSTRACT

A detachable floor unit (12) and power drive unit (14) for a reciprocating floor conveyor. The detachable floor unit includes a guide mechanism (30, 32) for supporting and guiding transverse drive beams (22, 23, 24). The power drive unit (14) includes drive assemblies (72, 73, 74) that have piston cylinder motors that are angled upwardly to bias the assemblies into engagement with the transverse drive beams.

12 Claims, 13 Drawing Sheets

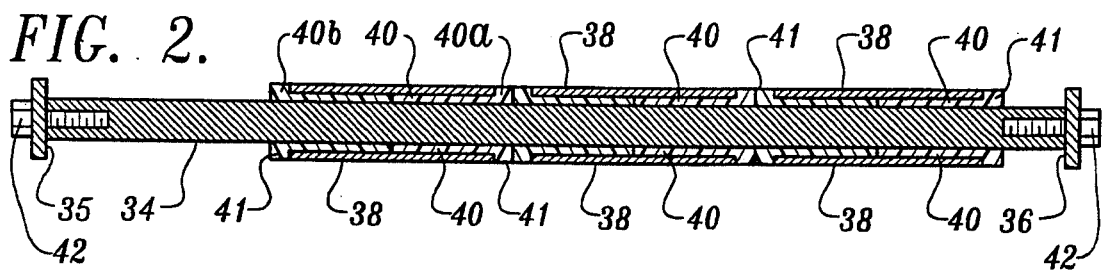
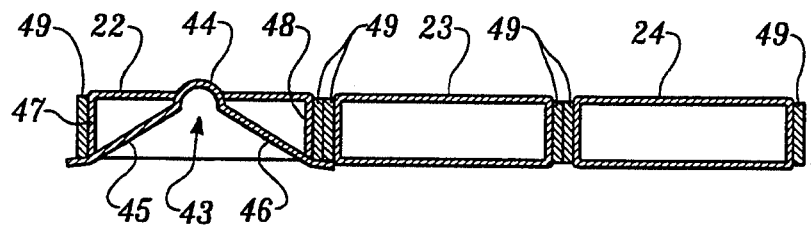
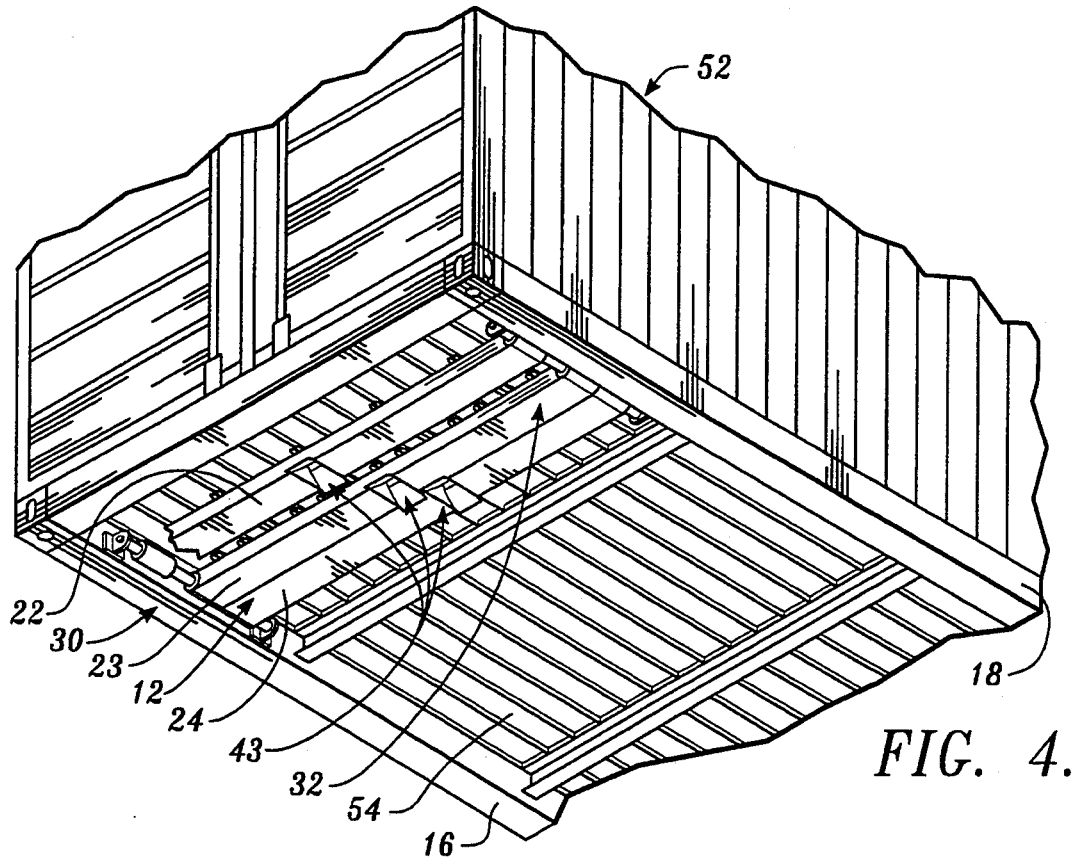
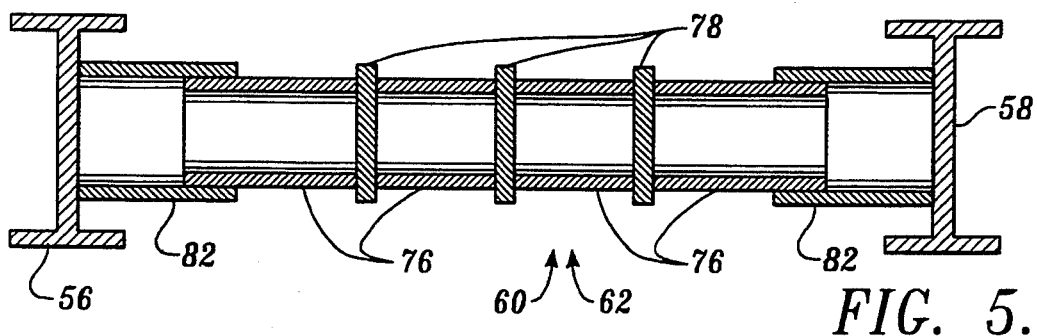

RECIPROCATING FLOOR CONVEYOR HAVING SEPARABLE FLOOR AND DRIVE PORTIONS

TECHNICAL FIELD

This invention relates to improvements on reciprocating floor conveyors and, in particular, to improvements on the conveyor that forms the subject matter of my U.S. Pat. No. 5,000,647, granted Oct. 19, 1989, and my U.S. Pat. No. 5,092,732, granted Mar. 3, 1992.

BACKGROUND OF THE INVENTION

My aforementioned U.S. Pat. Nos. 5,000,647 and 5,092,732 present background information with respect to both reciprocating floor conveyors and cargo containers used for transporting goods by ship, truck, and/or railway without unloading the shipped goods from the container at intermediate points. My U.S. Pat. Nos. 5,000,647 and 5,092,732, and U.S. Pat. No. 4,966,275, granted Oct. 30, 1990, to Olof A. Hallstrom, disclose different ways of providing a separable connection between power drive and floor portions of a reciprocating floor conveyor. The floor portion of the conveyor is incorporated into the cargo container. The power drive portion of the conveyor is incorporated into the transporting vehicle for the cargo container.

It is known to mount a conveyor on a conveyor frame and then make the conveyor frame separable from a support frame which carries a drive mechanism for powering the conveyor. A separable connection is provided between the drive mechanism and the conveyor. An early example of this arrangement is disclosed by U.S. Pat. No. 2,401,465, granted Jun. 4, 1946, to John D. Cwicig. This patent discloses an elongated conveyor frame 20 which supports an elongated screw conveyor 23 having a drive sleeve 16. Sleeve 16 includes a square-shaped opening which receives a square drive shaft 12. The drive shaft 12 is a part of a drive mechanism 7 which is carried by a support frame 5. The conveyor frame 20 is mountable on the support frame 5, with the drive shaft 12 extending through the drive sleeve. The engagement of the drive shaft 12 with the drive sleeve provides a detachable connection between the driven component 23 of the conveyor and the drive mechanism 7 carried by the support frame 5. The conveyor is easily and quickly disconnected from the drive mechanism by sliding the drive shaft 12 relatively out from the drive sleeve 16.

A number of years ago, I developed a reciprocating floor conveyor which included detachable connections between hydraulic drive units and transverse drive beams that are connected to the floor members of the conveyor. This enabled a user to disconnect the drive units from the floor members so that the drive units could be separated from the floor portion of the conveyor. Examples of these conveyors are disclosed in my following U.S. Pat. Nos. 4,712,467, granted Dec. 15, 1987; U.S. Pat. No. 4,793,469, granted Dec. 27, 1988; and U.S. Pat. No. 4,821,868, granted Apr. 18, 1989. Each of these conveyors is usable with a cargo container and its transporting vehicle. The drive units are connectable to the main frame members of the vehicle. The transverse drive beams are connectable to floor members in the container. Clamps used to connect the transverse drive beams to the cylinder barrels of the drive units are removable for the purpose of disconnecting the transverse drive beams and the floor members from the drive units.

Early on, I investigated a number of ways of providing a simple plug-in connection which could be used in place of the clamps. These included connections of the type shown in my U.S. Pat. No. 4,899,870, granted Feb. 13, 1990, and in my U.S. Pat. No. 4,907,691, granted Mar. 13, 1990. I considered using a variation of the connection shown in FIGS. 24 and 25 of U.S. Pat. No. 4,899,870. The U-shaped cradle member was directed downwardly and was connected to the bottom of the transverse drive beam. The block was connected to the movable component of the drive unit. The use of a block and cradle member connection was explored because I could see that if I used the detachable clamp-type connection disclosed in my aforementioned U.S. Pat. Nos. 4,712,467, 4,793,469, and 4,821,468, it would be difficult to lower the container onto the support frame and make the connection without structural damage occurring to the drive units. The cargo container is quite large and heavy. A slight sideways movement of it could move the clamp members that are connected to the transverse drive beams against a component of the drive units. Resulting contact could cause substantial damage to the drive units. I soon realized that this problem would exist even if I used a plug-in connection such as the connection disclosed in my U.S. Pat. No. 4,899,870.

An inspection of U.S. Pat. No. 4,966,275 shows that this problem was also recognized by Olof A. Hallstrom. Mr. Hallstrom addresses the problem in a very unique way. He provides two transverse beams for each drive unit. A first transverse drive beam (connector beam) is connected to each set of floor members. A second transverse drive beam (drive member beam) is connected to the moveable component of each drive unit. The connector beam is formed to include a latch socket. The drive member beam is provided with a spring biassed latch pin. In this patent, it is stated (column 3, line 64 to column 4, line 9):

"As the connector beams 34', 40', and 44' are lowered onto the drive member beams 34", 40", and 44", respectively, the latch pins 54, may or may not register with the latch sockets 62, since the drive member beams may be at any random positions relative to the transverse frame. If they do not register, they are depressed into the sleeves 52 against the compressive resistance of the coil springs 60. The drive mechanism then is activated to move the drive member beams 34", 40", and 44" relative to the overlying connector beams 34', 40', and 44', respectively, until the latch pins 54 are brought into registry with latch sockets 62. Thereupon, the latch pins snap into the latch sockets by extension of the coil springs." Prior to learning of this patent, I approached the problem in a much different way, as will hereinafter be described with reference to my aforementioned U.S. Pat. Nos. 5,000,647 and 5,092,732.

It appears to me that the detachable connection disclosed in U.S. Pat. No. 4,966,275 would be undesirable for several reasons. Firstly, if the connector beams should come down onto the drive member beams, with side edges of the connector beams outwardly of the latch pins, and with the connector beams moving sideways toward the latch pins, it would appear that contact between the connector beams and the latch pins would most likely cause severe damage to the latch pins and their support and guide structures. Secondly, it appears that it would be difficult to make the latch pins strong enough to carry the loads that would be imposed on them by the piston-cylinder drive units. Thirdly, it appears that it would be difficult to mount the latch pins in the drive member beams.

Following consideration of a number of separable connections, over a number of years, I approached the problem by providing a drive mechanism characterized by husky drive legs, and by positively lowering the drive legs into a spaced relationship from all parts of the container, and maintaining this spaced relationship until the container is fully loaded onto, and is securely connected to, the transporting vehicle. I then positively raised the drive legs upwardly to place their upper ends into sockets in the transverse drive beams to make the drive connection. As disclosed in my U.S. Pat. Nos. 5,000,647 and 5,092,732, the drive legs are at their lower ends mounted for pivotal movement on vertically movable supports. A separate piston-cylinder drive unit is connected to each drive leg. Extension and retraction of the drive units swing the drive legs in position about their lower ends and reciprocate the slat members. The drive legs are raised and lowered by pneumatic lifts which also allow the drive legs to move downwardly as they swing so that the upper ends of the drive legs travel straight rather than arcuate paths.

Experimentation with the conveyor system disclosed in my U. S. Pat. Nos. 5,000,647 and 5,092,732 led to the making of the present invention. An object of the present invention is to provide an improved apparatus for vertically moving the drive legs. Another object of the invention is to provide each drive leg (herein "drive post") with a pair of piston-cylinder units which are adapted to help hold the drive posts in a driving engagement with the transverse drive beams. A further object of the invention is to provide a mechanism for guiding and bracing the transverse drive beams as they are reciprocated. This feature of the invention has general utility with respect to all types of reciprocating slat conveyors.

DISCLOSURE OF THE INVENTION

Briefly described, the present invention comprises a reciprocating floor conveyor having a lower frame and an upper frame. The upper frame is connectable to and removable from the lower frame. A plurality of longitudinal conveyor slats are carried by the upper frame. The conveyor slats are divided into a plurality of sets. A transverse drive beam is mounted below to each set of conveyor slats. A plurality of drive units are provided, one for each transverse drive beam. The drive units are mounted onto the lower frame. Each drive unit includes a drive post having an upper end. A drive member is mounted at the upper end of each drive post and is engageable with an associated transverse drive beam. Each drive unit further includes a vertically-adjustable lift mechanism for moving the drive post between a down position, in which the drive member is separate from the associated transverse drive beam, and an up position, in which the drive member drivingly engages the associated transverse drive beam. A forward piston/cylinder motor is positioned forwardly of each drive post. A forward piston/cylinder motor has one end pivotally connected to the lower frame and another end pivotally connected to an upper portion of its drive post. A rearward piston/cylinder motor is positioned rearwardly of each drive post and has a cylinder end pivotally connected to the lower frame and a rod end pivotally connected to an upper portion of its drive post. When the drive posts are in an up position, each piston/cylinder motor slopes upwardly from its connection to the frame to its connection with its drive post. Each piston/cylinder motor has a large area lower working chamber and a small area upper working chamber. Fluid pressure is introduced into the lower working chamber and removed from the upper working chamber of a first of the piston/cylinder motors, so that such first piston/cylinder motor will push on the drive post. At the same time, fluid pressure is introduced into the upper working chamber and removed from the lower working chamber of the second piston/cylinder motor, so that such second piston/cylinder motor will pull on the drive post. Fluid pressure acting on the large area lower working chamber will provide a differential vertical force acting on the drive post to urge it upwardly into engagement with its transverse drive beam.

The present invention also includes a drive mechanism for the reciprocating floor conveyor comprising a frame, including a slat-supporting framework having a first end section, a second end section, a pair of laterally spaced-apart side frame members, and a drive beam window located transversely between the side frame members and longitudinally between the two end sections. The drive mechanism also includes support beams on the end sections of the framework for supporting the conveyor slats. A plurality of elongated conveyor slats are mounted adjacent each of the support beams. The conveyor slats are divided into at least two sets, and are movable along the support beams in a first direction for conveying a load. The conveyor slats are retractable in an opposite direction. A plurality of transverse drive beams are provided within the drive beam window. One transverse drive beam is provided for each set of conveyor slats. Each transverse drive beam is connected to its set of conveyor slats. Each transverse drive beam has opposite ends and a guide member for each end connected to the drive beam. Each guide member is directed longitudinally along the conveyor. A pair of longitudinal guide and support rails, one on each side of the conveyor, are connected to the frame. The guide and support rails extend lengthwise of the conveyor and transversely of the drive beams. The guide members slidably and guidingly engage the guide and support rails. The transverse drive beams move back and forth longitudinally of the conveyor and the guide and support rails, and, as they move, the guide members and the guide and support rails guide the transverse drive beams in their longitudinal travel. This causes the two ends of each drive beam to move together, and the transverse drive beams, the guide members, and the guide and support rails transmit to the frame the weight that is imposed on the conveyor slats in the region of the drive beam window.

According to an aspect of the invention, the upper frame includes a lower boundary, and the lower frame includes an upper boundary. Each transverse drive beam includes a lower boundary that is no lower than the lower boundary of the upper frame. In this manner, the transverse drive beams do not project below the lower boundary of the upper frame into a position where they could be damaged upon mounting the upper frame onto the lower frame.

According to another aspect of the invention, the drive post, in its down position, is positioned below both the lower boundary of the upper frame and the upper boundary of the lower frame. In this manner, the drive posts do not project upwardly beyond the upper boundary of the lower frame into a position where they may be damaged upon mounting the upper frame to the lower frame.

Preferably, each transverse drive beam includes a socket portion of receiving the drive member of a drive post, and a pair of angled surfaces that face downwardly and toward each other and abut the socket portion of the transverse drive beam. When the upper frame is mounted onto the lower frame, if the drive post and socket portion are not vertically aligned, the drive post will contact an angled surface upon being raised and be guided toward the socket portion.

Preferably, the guide and support rails are elongated beams and the guide members are tubes which surround the elongated beams. Also preferably, the elongated beams are cylindrical and the guide members are tubular and concentrically surround the elongated cylindrical beams.

According to another aspect of the invention, a low friction material is provided between each tubular guide member and the elongated cylindrical beams.

Other aspects and features of this invention will become apparent from inspection of the various figures of the drawings, the detailed description of the best mode for carrying out the invention, and the appended claims, which are incorporated herein as part of the disclosure of the invention.

BRIEF DESCRIPTION OF THE DRAWINGS

Like reference numerals are used to indicate like parts throughout the various figures of the drawing, wherein:

FIG. 2 is a sectional view taken along the line 2—2 of FIG. 1 illustrating the guide mechanisms;

FIG. 3 is a sectional view taken along the line 3—3 of FIG. 1 illustrating the socket of a transverse drive beam;

FIG. 4 is a fragmentary isometric view of the underside of a cargo container showing the detachable floor unit;

FIG. 5 is a sectional view taken along the line 5—5 of FIG. 1 illustrating the box beam assemblies of the power drive unit;

BEST MODE FOR CARRYING OUT THE INVENTION

My U.S. Pat. No. 5,092,732 discloses a reciprocating floor conveyor having a detachable conveyor floor unit and power drive unit. The detachable conveyor floor unit can be independently transported, while other similar floor units can be driven by the power drive unit. The present invention is an improvement over the reciprocating floor conveyor disclosed in this patent.

Figure 1:
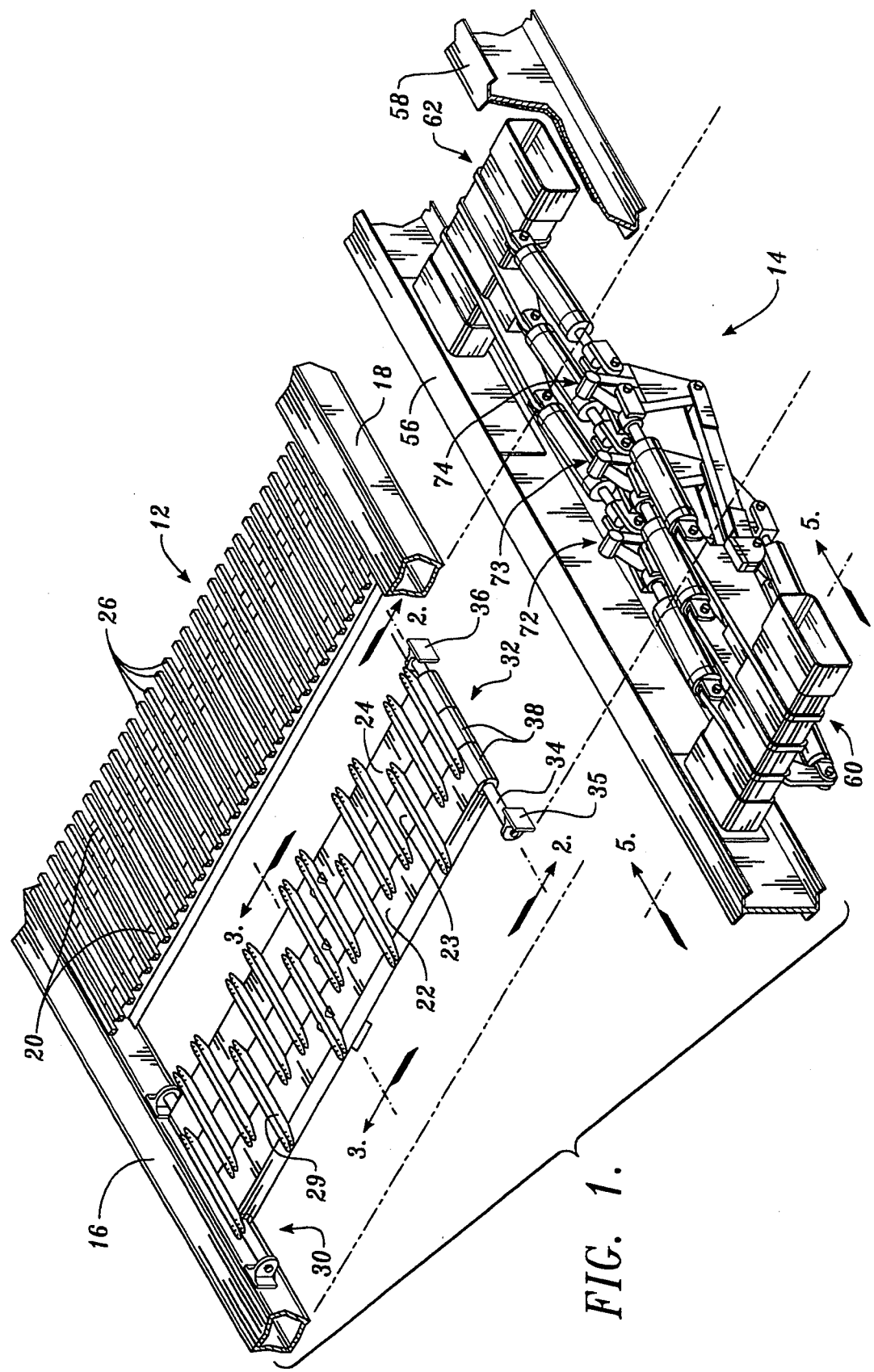
FIG. 1 is a fragmentary exploded isometric view of the detachable floor unit and power drive system of the present invention.

FIG. 1 is a fragmentary, exploded view of the detachable floor unit 12 and the power drive unit 14. The detachable conveyor floor unit 12 is part of a larger rectangular cargo container, such as the container disclosed in my '732 patent, which container has four side walls and a ceiling. The power drive unit 14 may be installed at a fixed location, such as at a garbage disposal site, or as part of a transporting vehicle for carrying cargo containers equipped with reciprocating floor conveyors.

The floor unit 12 includes a pair of laterally-spaced elongated box beams 16, 18 that extend the length of the container. Lateral frame members 20 are mounted transversely between the box beams 16, 18. Lateral frame members 20 are mounted parallel to each other and extend, in an array, along the length of the container, except for a portion of the floor of the conveyor where a set of transverse drive beams 22, 23, 24 are mounted. This portion of the conveyor shall be referred to as the "drive beam window." It should be noted that the drive beam window may be located at any position along the length of the conveyor.

An array of pairs of elongated 1"×1" guide beams 26 are mounted longitudinally across the tops of the lateral frame members 20. The guide beams 26 extend the length of the container, except for the drive beam window portion of the conveyor floor. Plastic slide bearings (not shown) are mounted onto the guide beams 26, and the elongated conveyor slats (also not shown) are slidably mounted onto the bearings. The box beams 16, 18, lateral frame members 20, and guide beams 26 are secured together, preferably, by welding.

The transverse drive beams 22, 23, 24 are elongated, flat, rectangular box beams and are mounted transversely within the drive beam window, parallel to each other and parallel to the lateral frame members 20. A series of pairs of cleats 29 are mounted on top of the transverse drive beams 22, 23, 24. Each cleat 29 is an inverted, U-shaped channel member with angled front and back ends. The first, fourth, seventh, etc. pairs of cleats are mounted to the first transverse drive beam 22; the second, fifth, eighth, etc. pairs of cleats are mounted to the middle transverse drive beam 23; and the third, sixth, ninth, etc. pairs of cleats are mounted to the third transverse drive beam 24. Each pair of cleats 29 is, in turn, fixedly secured, by means of screws, to the underside of a conveyor slat (not shown).

A pair of guide mechanisms 30, 32 support the transverse drive beams 22, 23, 24 at their ends. Each guide mechanism 30, 32 includes a cylindrical guide rail 34 secured between a pair of mounting brackets 35, 36. The mounting brackets 35, 36 are attached to the box beams 16, 18. A tubular sleeve 38 is secured at the end of each transverse drive beam 22, 23, 24. The tubular sleeves 38 closely fit around the guide rail 34 and are slidable therealong, independent of one another.

FIG. 2 illustrates the construction of guide mechanisms 30, 32. A tubular bearing surface 40 is secured to the inner wall of the tubular sleeves 38 so as to reduce friction between the tubular sleeves 38 and the guide rail 34. Each tubular bearing surface 40 comprises two sleeves 40a, 40b having flanges 41. Screws (not shown) secure bearings 40 to sleeves 38. Mounting brackets 35, 36 are secured to guide rail 34 by means of bolts 42.

The guide mechanisms 30, 32 function to limit or restrain the movement of the transverse drive beams 22, 23, 24 to reciprocating movement longitudinally along the conveyor. The guide mechanisms 30, 32 also support the transverse drive beams 22, 23, 24 so that the weight carried by the conveyor slats in the drive beam window region is transferred to the box beams 16, 18 of the conveyor frame.

FIG. 3 shows the construction of the transverse drive beams 22, 23, 24. Each transverse drive beam includes a socket 43. In FIG. 3, only the socket 43 of transverse drive beam 22 is shown. The socket 43 includes a semi-circular upper region 44 and a pair of angled guide plates 45, 46 that extend from the semi-circular upper region 44 longitudinally outwardly beyond the sidewalls 47, 48 of the transverse drive beam 22. Transverse drive beams 23 and 24 have a similar socket design to that of drive beam 22, except that the sockets of drive beams 23 and 24 are offset transversely from the socket 43 of drive beam 22.

Wear strips 49 are mounted to the sidewalls 47, 48 of each transverse drive beam 22, 23, 24. Wear strips 49 provide a bearing surface between the transverse drive beams, and also provide reinforcement to the beams.

FIG. 4 is a fragmentary isometric view of the under side of a cargo container 52 equipped with a reciprocating floor conveyor 54 and the floor unit 12 of FIGS. 1-3. As shown in FIG. 4, transverse drive beams 22, 23, 24 are secured between guide mechanisms 30, 32, which are mounted to the inner sides of box beams 16, 18. Sockets 43 are positioned on the underside of the transverse drive beams 22, 23, 24 and the transverse spacing of the sockets 43 is evidenced by the drawing.

Returning to FIG. 1, the power drive unit 14 is mounted between a pair of longitudinal main I-beams 56, 58. The main I-beams 56, 58 would form the primary structural framework for a flat bed trailer, for example. The power drive unit 14 includes a pair of lateral box beam assemblies 60, 62 that are supported between the main I-beams 56, 58. Three drive assemblies 72, 73, 74, one for each transverse drive beam 22, 23, 24, are secured between the lateral box beam assemblies 60, 62, and are discussed later.

As shown in FIG. 5, the lateral box beam assemblies 60, 62 include a series of box beam segments 76 that are welded between three support arms 78. At the ends of the box beam segments 76, an enlarged adjustable box beam segment 82 is positioned. The adjustable box beam segments 82 telescope outwardly of the ends of box beam segments 76 so that the length of the box beam assemblies 60, 62 can be adjusted to conform with the lateral spacing of the main I-beams 56, 58. During installation, the adjustable segments 82 are slid inwardly, so that the box beam assemblies and power drive unit can be lowered, or raised, between the I-beams, 56, 58. The adjustable box beam segments 82 are then adjusted to conform with the lateral spacing of the I-beams 56, 58. The adjustable box beam segments 82 are welded to the inner sections of the main I-beams 56, 58. Then, the power drive unit 14 is positioned in alignment with the conveyor, and the segments 82 are welded to the outermost box beam segments 76.

Figure 6:
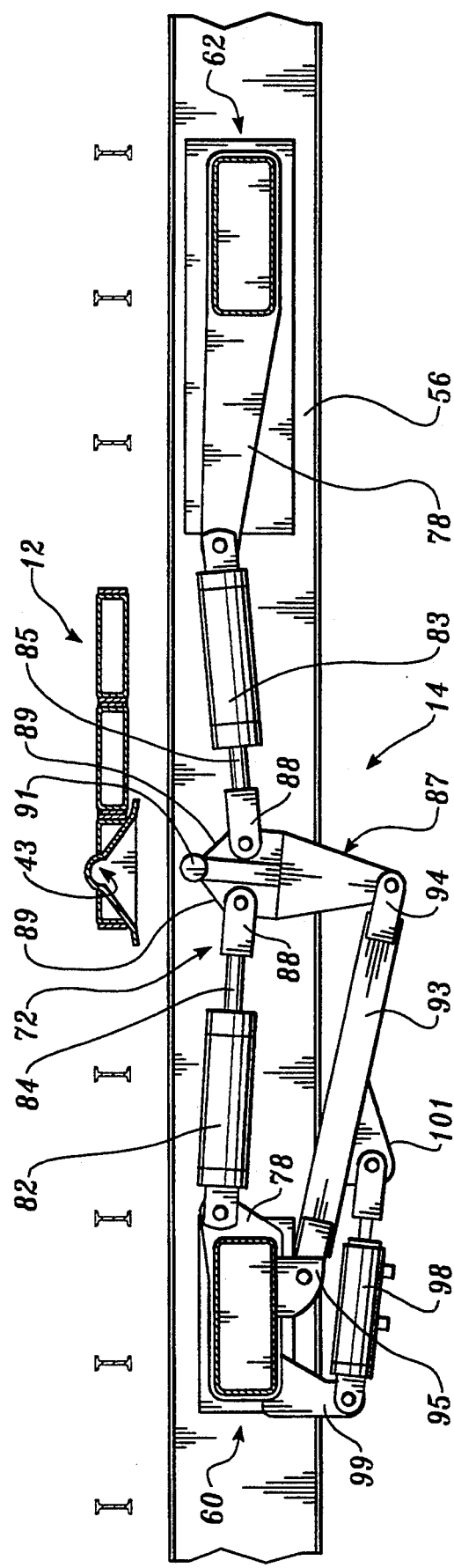
FIG. 6 is a side elevation view of a drive assembly of a power drive unit.
Figure 7:
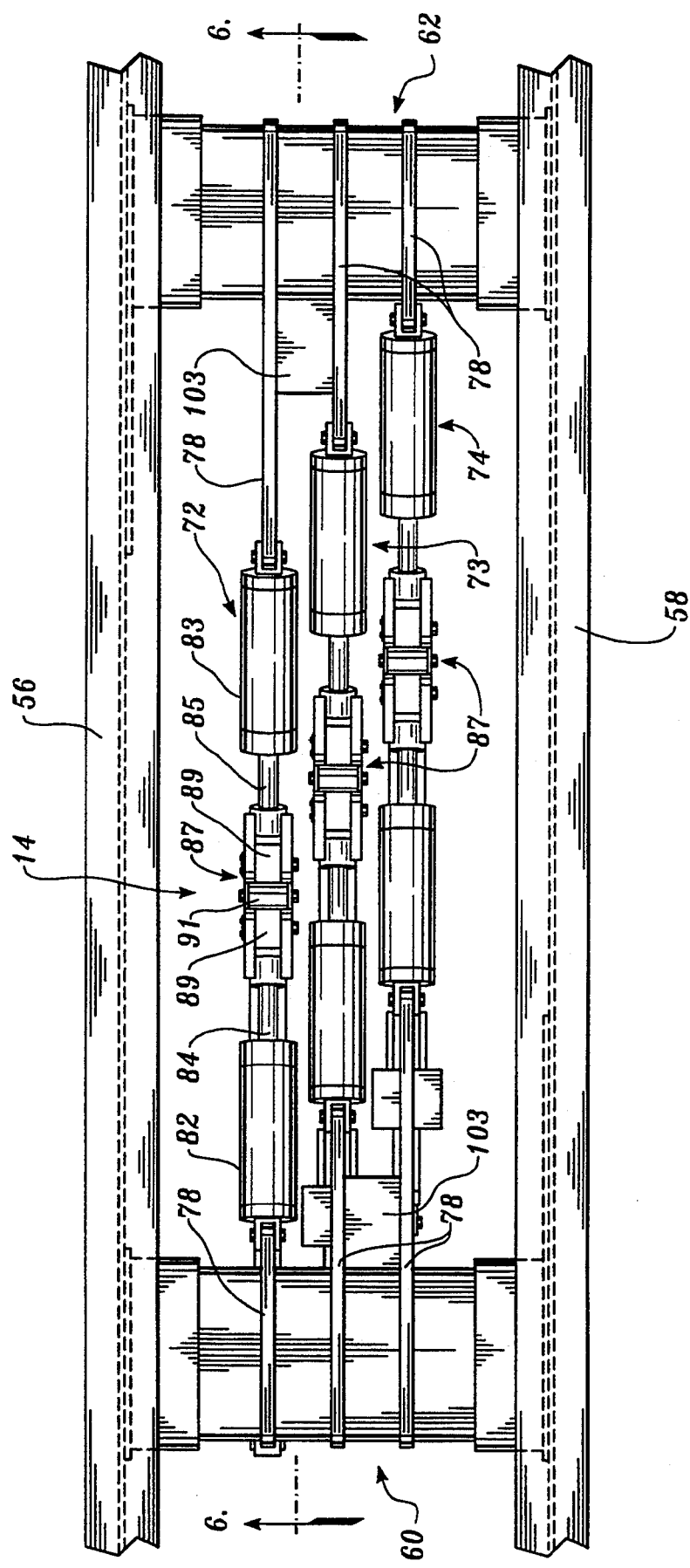
FIG. 7 is a plan view of the power drive unit.

FIG. 6 is a side elevation view of the floor unit 12 and power drive unit 14. FIG. 7 is a plan view of the power drive unit 14. Drive assembly 72 is illustrated in FIG. 6. Drive assemblies 73 and 74 are similar to drive assembly 72, with certain exceptions discussed later, and are shown in FIG. 7. Drive assembly 72 includes the support arms 78 that extend inwardly from the box beam assemblies 60, 62. A first piston-cylinder motor 82 and a second piston-cylinder motor 83 are pivotally secured at their outer ends to the support arms 78. Piston rods 84, 85 of each piston-cylinder motor 82, 83 are pivotally secured to a common vertical drive post 87 via clevises 88. The drive post 87 is an upright structure having a pair of angled upper surfaces 89 and a ball 91 in the form of a stub, cylindrical segment. A bottom linkage 93 is pivotally secured to the bottom of the drive post 87 via clevis 94 and is, in turn, pivotally secured to the under side of the box beam assembly 60 by means of bracket 95.

A piston-cylinder motor 98 is pivotally secured at its cylinder end to the box beam assembly 60, via bracket 99, and at its piston rod end to the bottom linkage 93, via bracket 101. The box beam assembly 60, piston-cylinder motor 82, drive post 87, and lower linkage 93 form a four-bar linkage that supports the drive post 87. The lower piston-cylinder motor 98 serves as a lift mechanism to raise and lower the drive post 87, thereby raising the ball 91 above the level of the main I-beams 56, 58 and into engagement with the socket 43 of the floor unit 12. The hydraulic connections for the piston cylinder motors 82, 83, 98 and the controls therefore, for clarity, have not been shown.

As shown in FIG. 7, the support arms 78 vary in length. Drive assembly 72 includes a long support arm connected to motor 83, and a short support arm connected to motor 82. Drive assembly 73 includes a pair of equal length support arms, and the support arms of drive assembly 74 are of the same length as the support arms of drive assembly 72, but are switched. Webs 103 act as braces between adjacent pairs of longer support arms. The drive assemblies 72, 73, 74 are mounted between the assemblies 60, 62 in a staggered configuration. The result being that the drive posts 87 of each drive assembly are longitudinally staggered, so as to align with the sockets of the transverse drive beams.

Figure 8:
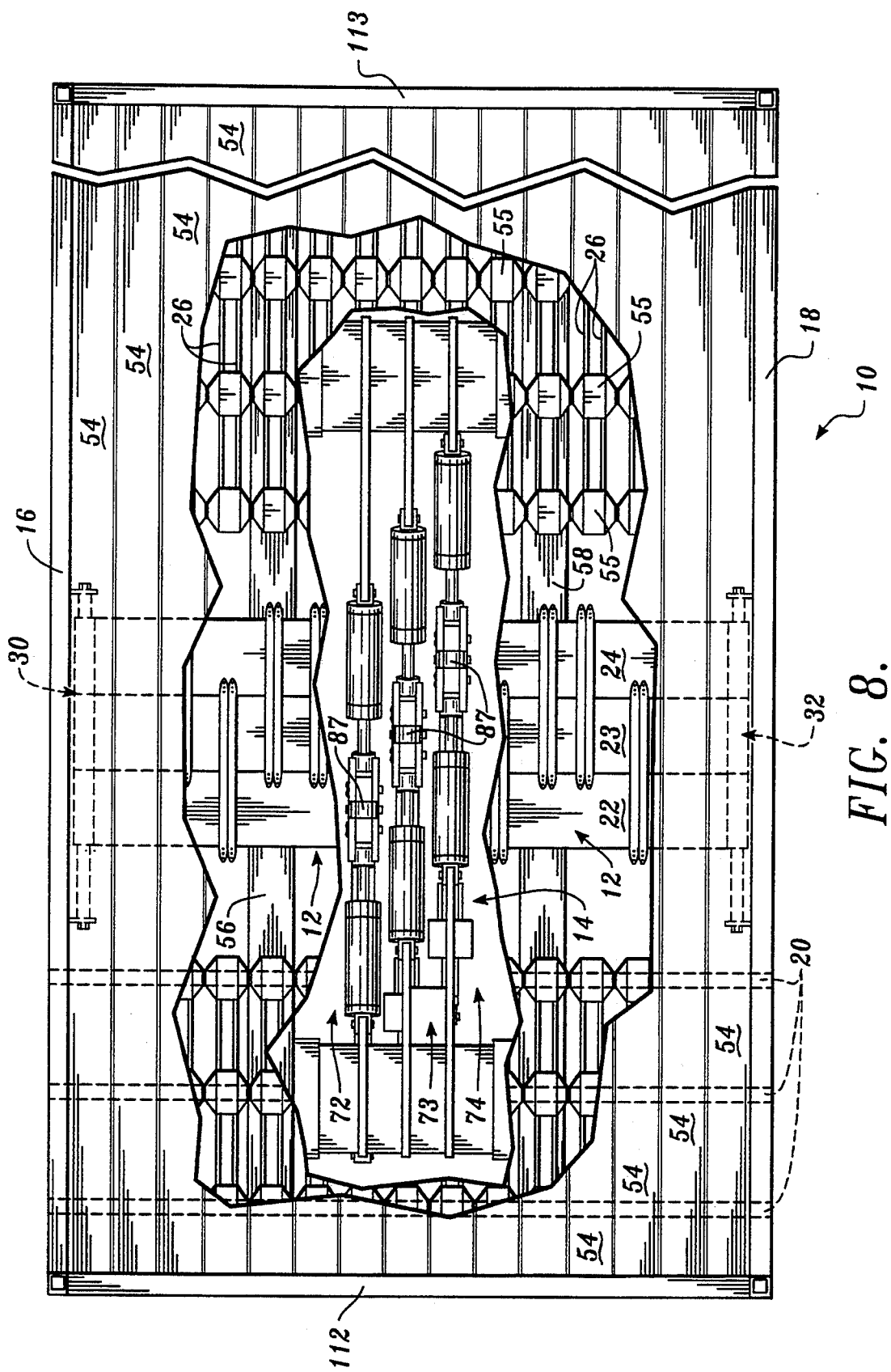
FIG. 8 is a plan view of the reciprocating floor conveyor with a portion of the conveyor slats cut away to illustrate the structure of the detachable floor unit and with a portion of the floor unit structure cut away to reveal the power drive unit.

FIG. 8 is a plan view of the reciprocating floor conveyor with a portion of the conveyor slats 54 cut away to reveal the support structure of the floor unit 12. A portion of the floor unit 12, likewise, is cut away to reveal the power drive unit 14. The transverse drive beams 22, 23, 24 extend the width of the conveyor and are slidably guided and supported by the guide mechanisms 30, 32. The power drive unit 14 is mounted between the main I-beams 56, 58 in a manner so that the drive posts 87 of the drive assemblies 72, 73, 74 are positioned below the transverse drive beams 22, 23, 24 and their respective sockets.

The reciprocating floor conveyor includes a plurality of elongated conveyor slats 54 that are mounted atop bearings 55 that snap onto the pairs of elongated guide beams 26 at the location of a lateral frame members 20. My prior U.S. Pat. No. 4,785,929 discloses a suitable design for the bearings 55, guide beams 26, and conveyor slats 54, and is incorporated herein by reference. The lateral box beams 16, 18 are framed by end box beams 112, 113 to define the dimensions of the conveyor.

Figure 9:
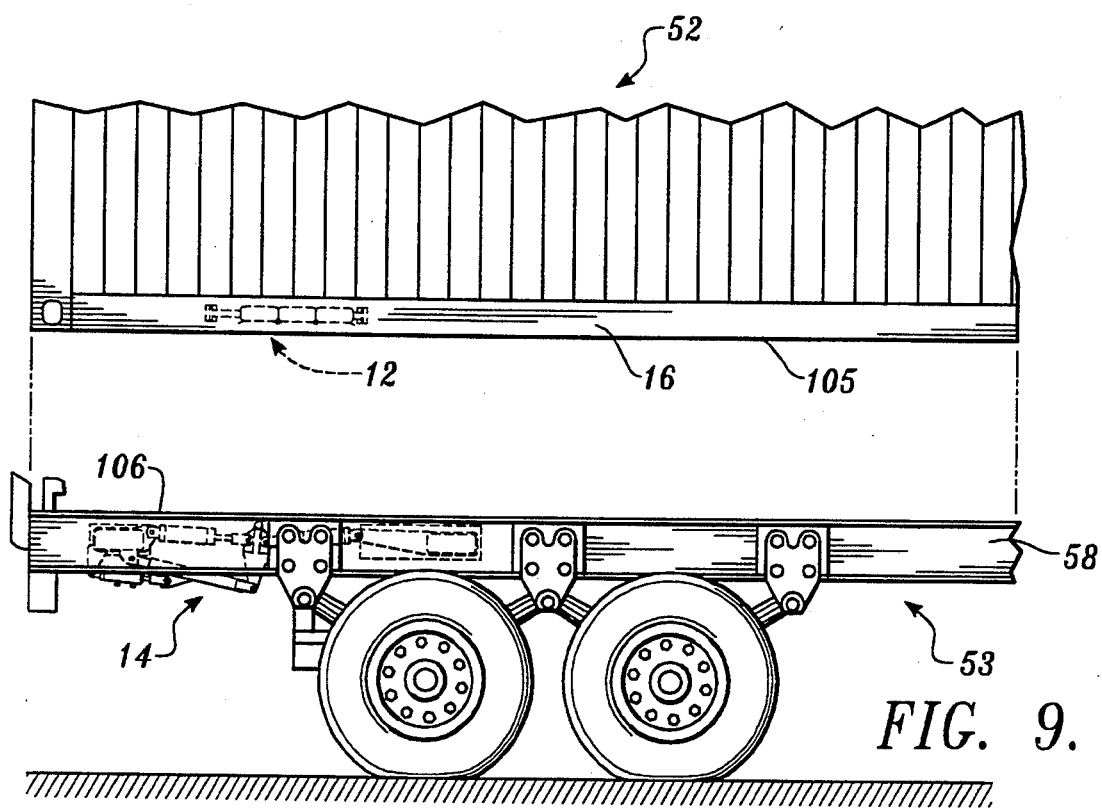
FIG. 9 is a fragmentary side elevation view of a cargo container and trailer bed equipped with a detachable floor unit and power drive system of the present invention.
Figure 10:
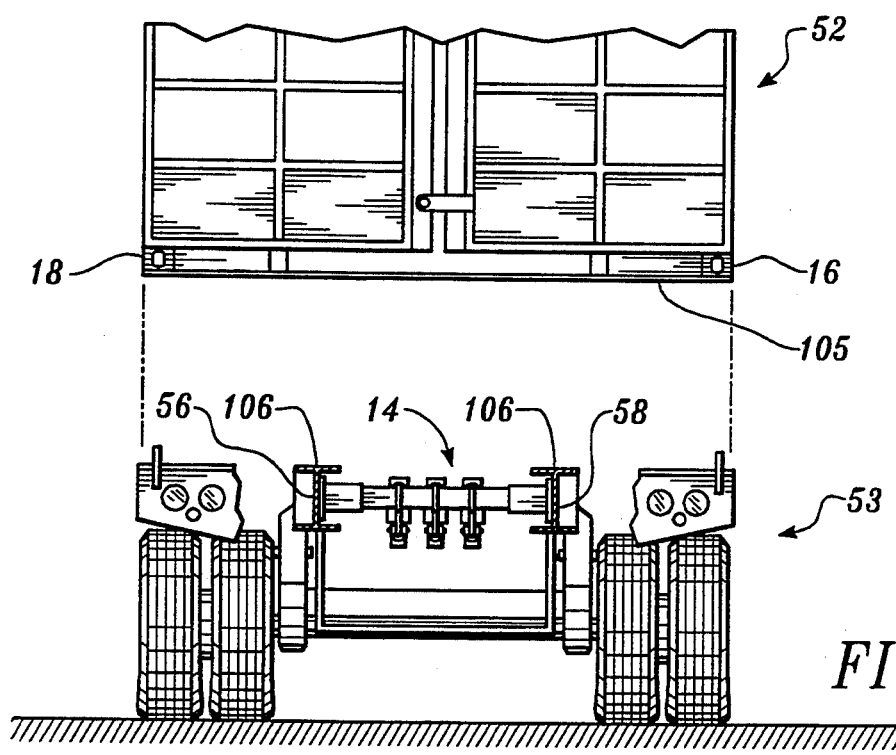
FIG. 10 is a fragmentary rear elevation view of the cargo container and trailer of FIG. 9.

FIGS. 9 and 10 illustrate the manner in which the cargo container 52 is mounted atop the main I-beams 56, 58 of a trailer bed 53. As stated previously, the power drive unit 14 and drive beam window of the floor unit 12 can be positioned anywhere along the length of the I-beams 56, 58 and floor of the cargo container 52 where it is practical for their installation. In FIGS. 9 and 10, the floor unit 12 and power drive unit 14 are shown installed at the tail end of a flat bed trailer.

As shown in FIG. 9, the floor unit 12 and power drive unit 14 are constructed so that no part thereof protrudes beyond the frame structures 16, 58 of the cargo container 52 and the trailer bed 53. The box beams 16, 18 of the floor unit 12 have a lower boundary 105. The floor unit 12 is contained between the box beams 16, 18 above this lower boundary 105. Thus, the lower boundary of the transverse drive beams does not extend lower than the lower boundary 105 of the box beams 16, 18. In a similar manner, the main I-beams 56, 58 of the trailer bed 53 have an upper boundary 106. The power drive unit 14 is contained between the main I-beams 16, 18 below this upper boundary 106. This overall design allows the cargo container 52 to be loaded (usually by crane) onto the main I-beams 56, 58 without the floor unit 12 or power drive unit 14 interfering with the positioning of the cargo container on the trailer bed. Also, this design reduces the potential for damage to the drive unit 14 and floor unit 12.

Figure 11:
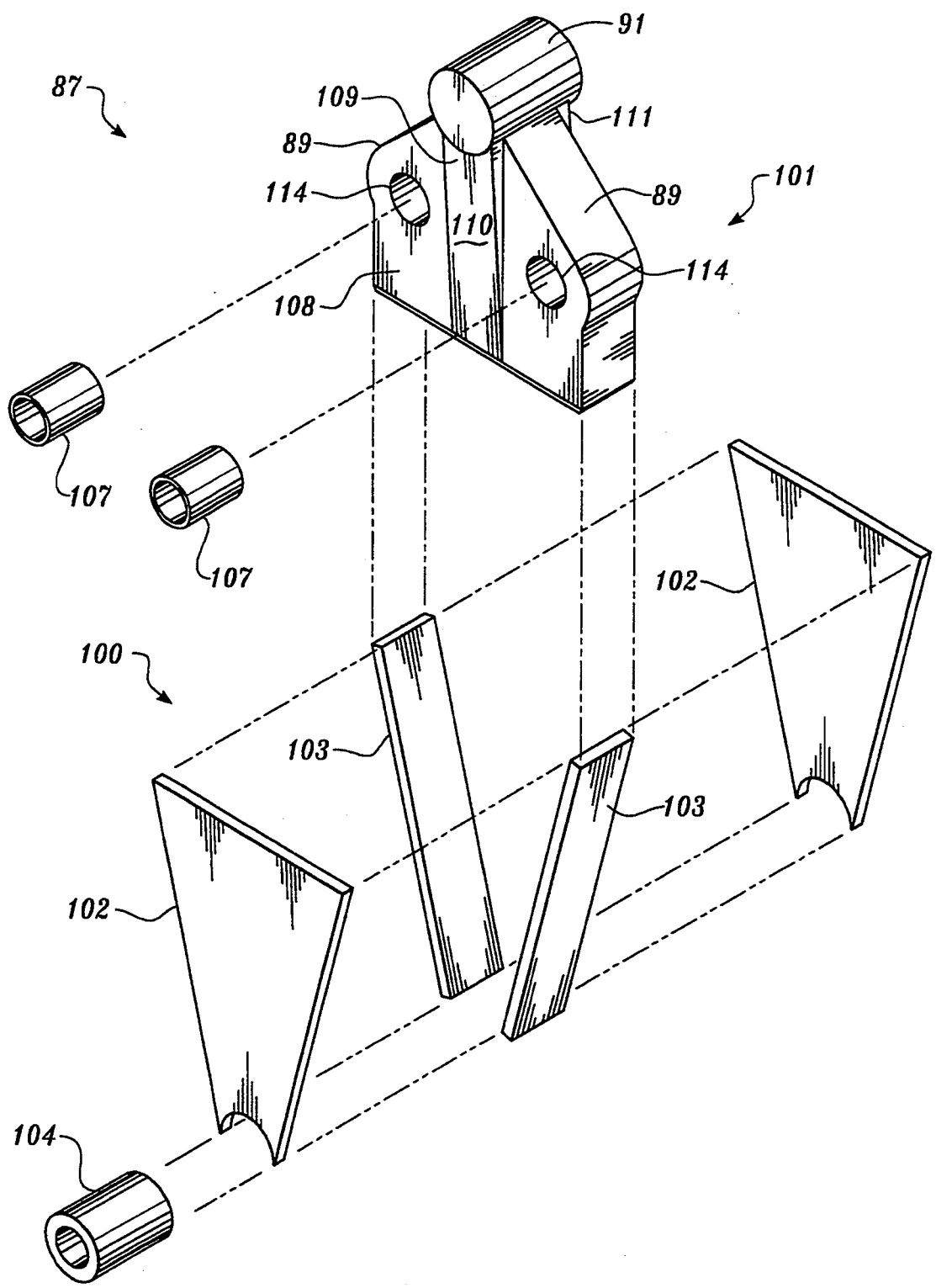
FIG. 11 is an exploded isometric view of the drive post for the drive units of FIG. 6.
Figure 12:
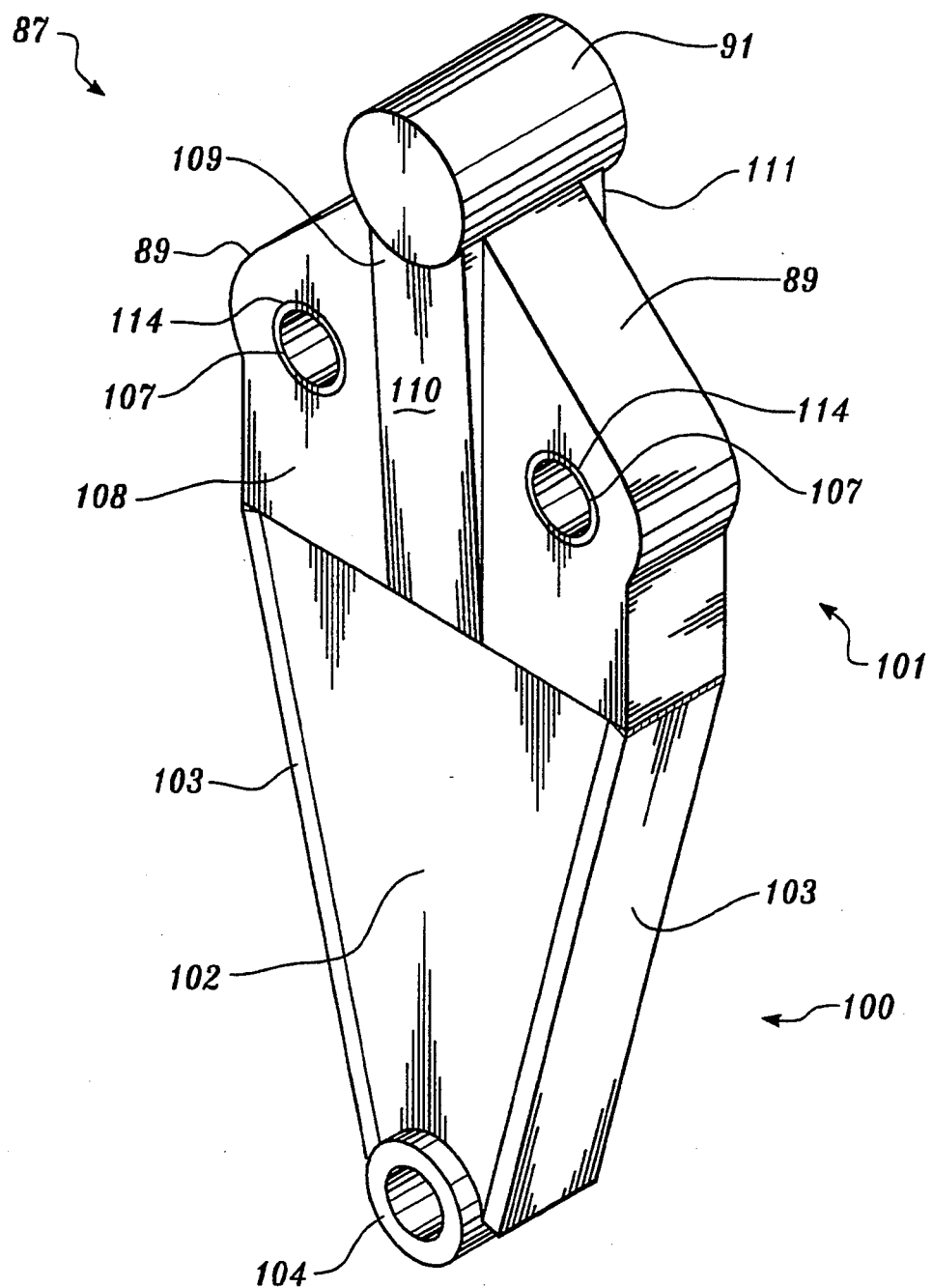
FIG. 12 is an assembled view of the drive post of FIG. 11.

In FIGS. 11, 12, the drive post 87 is shown to include a lower clevis 100 and an upper drive member mount 101. The lower clevis 100 includes a pair of V-shaped front and back plates 102, a pair of elongated rectangular side plates 103, and a bushing 104. The front and back plates 102 and side plates 103 form a box structure for supporting the drive member mount 101. The drive member mount 101 includes the ball 91. The ball 91 is mounted on support block 108. Support block 108 includes a central portion 109 that has tapered front and back sides 110, 111. The side portions of the support block 108 have angled surfaces 89. Bushing holes 114 are provided in the support block 108 to support cylindrical bushings 107. Bushing holes 114 receive clevises 88 mounted at the end of the piston rods.

Figure 13:
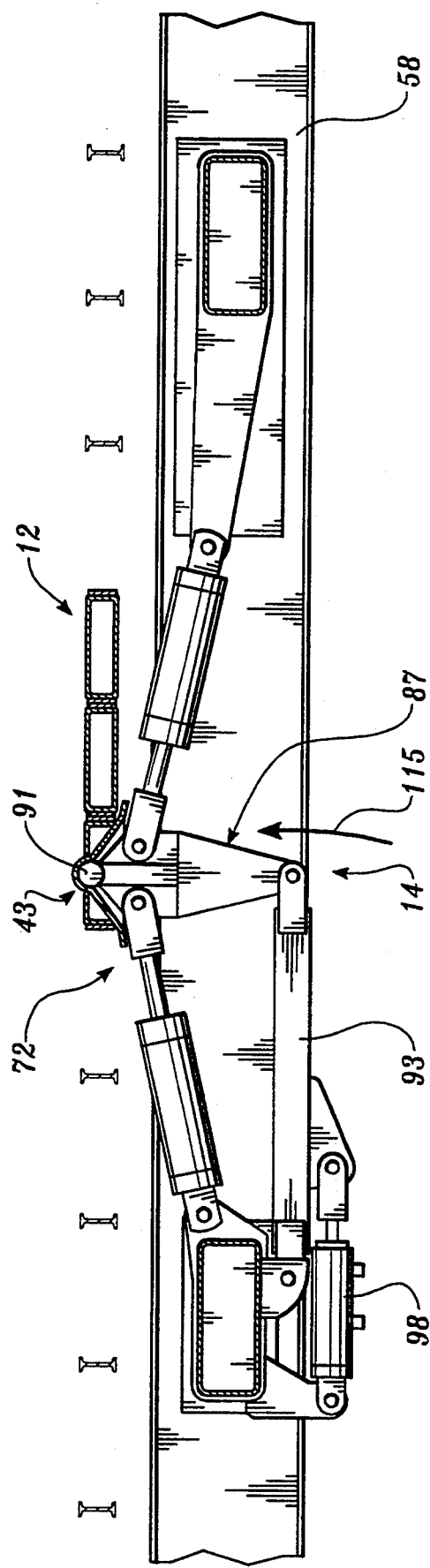
FIGS. 13-16 are side elevation views of the power drive unit and detachable floor unit illustrating the operation of the system.
Figure 14:
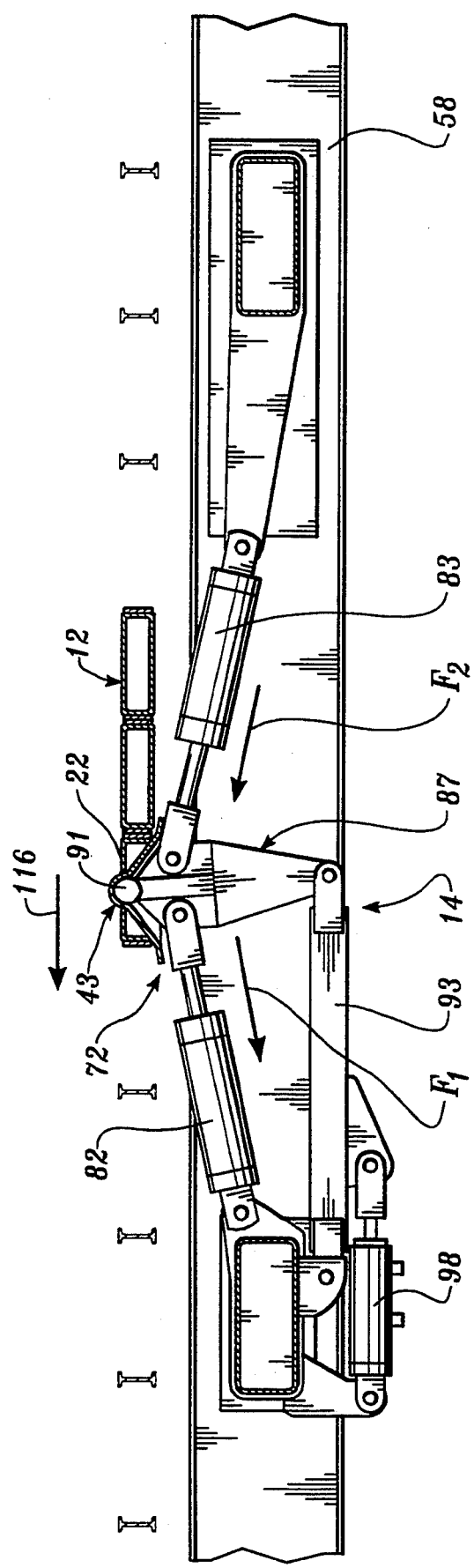
Figure 15:
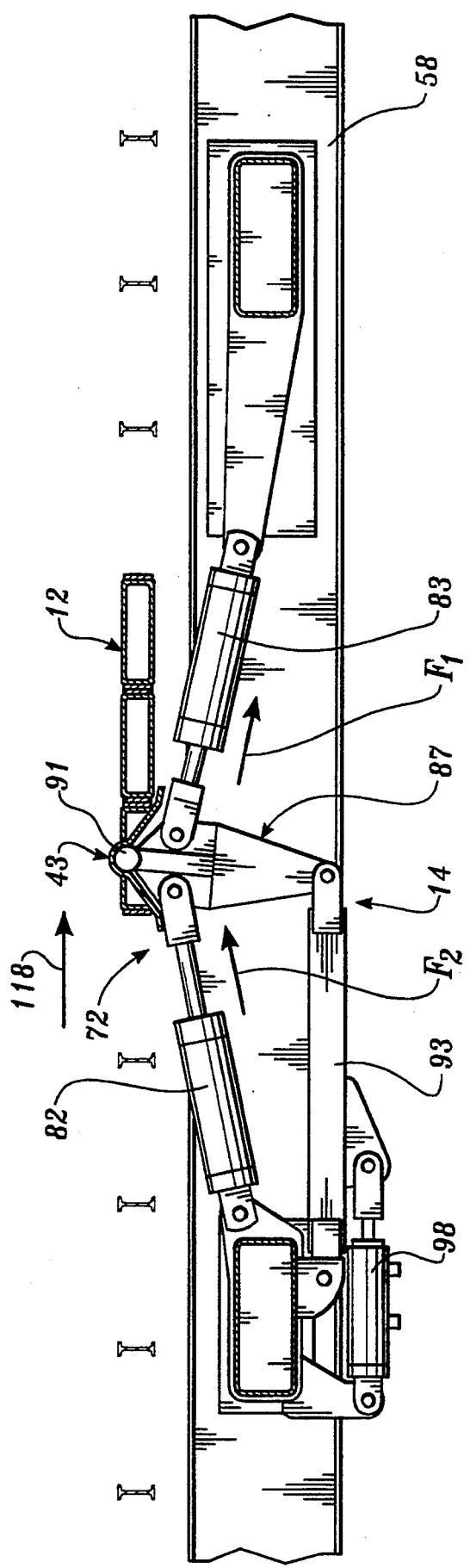

FIGS. 13–15 illustrate the operation of drive assembly 72 of the power drive unit 14 after the detachable floor unit 12 is positioned onto the main I-beams 56, 58. The operation of drive assemblies 73, 74 is similar. My prior U.S. Pat. No. 4,823,938 discloses the sequence of operation of a typical reciprocating floor conveyor for conveying a load. My prior U.S. Pat. Nos. 4,492,303, issued Jan. 8, 1985, and 4,821,868, issued Apr. 18, 1989, disclose similar types of reciprocating floor conveyors. In all the conveyors disclosed by those patents, it is necessary for the transverse drive beams to be operated in a back-and-forth reciprocating motion to control the conveyor slats. With the present invention, the lower piston-cylinder motor 98 is actuated to raise the lower linkage 93, which, in turn, raises the drive post 87, as indicated by arrow 115. The ball 91 of the drive post 87 engages the socket 43 of a transverse drive beam of the floor unit 12. All three drive assemblies 72, 73, 74 are raised simultaneously to engage the power drive unit 14 with the floor unit 12.

As shown in FIG. 14, to move transverse drive beam 22 to the left, as indicated by arrow 116, the first piston-cylinder motor 82 is retracted while the second piston-cylinder motor 83 is expanded. This creates a pulling force $F_1$ and a pushing force $F_2$ on the drive post 87, causing the drive post 87 to pivot. In turn, the transverse drive beam 22 moves longitudinally along the conveyor to the left, as indicated by arrow 116. This causes the set of conveyor slats mounted to transverse drive beam 22 to move along the conveyor floor. To retract the conveyor slats, the second piston-cylinder motor 83 is retracted and the first piston-cylinder motor 82 is expanded to pivot the drive post 87 to the right, as indicated by arrow 118 in FIG. 15. Retracting the conveyor slats simply reverses the pulling force $F_1$ and pushing force $F_2$. Transverse drive beams 23, 24 are operated in a similar manner.

Figure 16:
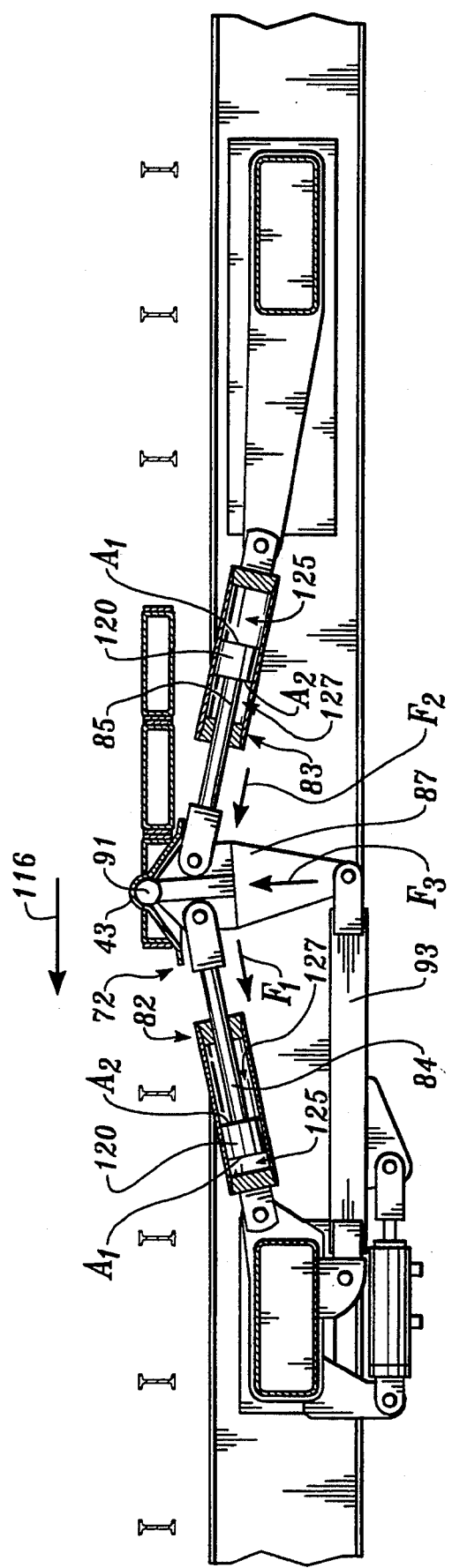

As shown in FIG. 16, each piston 120 of the piston-cylinder motors 82, 83 has a different surface area on each side subject to fluid pressure within the cylinder of the piston-cylinder motor. $A_1$ is the surface area of the side of each piston opposite its piston rod 84, 85 and is associated with a large area lower working chamber 125. $A_2$ is the surface area of the side of each piston 120 adjacent its piston rod 84, 85 and is associated with a small area upper working chamber 127. The surface area $A_1$ is greater than the surface area $A_2$ due to the portion of surface area $A_2$ that is blocked by the piston rod. During use, fluid pressure is introduced into a lower working chamber 125 and removed from an upper working chamber 127 to push the drive post 87, and fluid pressure is removed from the lower working chamber 125 and introduced into the upper working chamber 127 to pull on the drive post 87.

The configuration of the four-bar linkage, elements 60, 62, 82, 83, 87, and 93, is such that the piston-cylinder motors 82, 83 are always angled upwardly toward the drive post 87. The difference in surface areas $A_1$ and $A_2$, and the upward angle of the piston-cylinder motors 82, 83 create an upward force component $F_3$ on the drive post 87 while the drive assembly 72 is being operated. For example, when the drive post 87 is moved or pivoted to the left, as indicated by arrow 116, the surface area $A_1$ of the second piston-cylinder motor 83 and the surface area $A_2$ of the first piston-cylinder motor 82 are acted upon by the fluid pressure of the control system in the respective chambers of the piston-cylinder motors. Because the surface area $A_1$ is greater than the surface area $A_2$, the upward component of force created by surface area $A_1$, which pushes on drive post 87, is greater than the downward component of force created by surface area $A_2$ which pulls on drive post 87. This creates, at all times, an upward component of force $F_3$ that operates to keep the ball 91 engaged in the socket 43. When the drive post 87 is pivoted to the right, a similar upward force component, likewise, is created by the greater surface area $A_1$ of the first piston-cylinder motor 82 and the smaller surface area $A_2$ of the second piston-cylinder motor 83. The upward force component, which is maintained throughout the operation of the power drive unit, is an advantage of the present invention over my prior U.S. Pat. No. 5,092,732.

Figure 17:
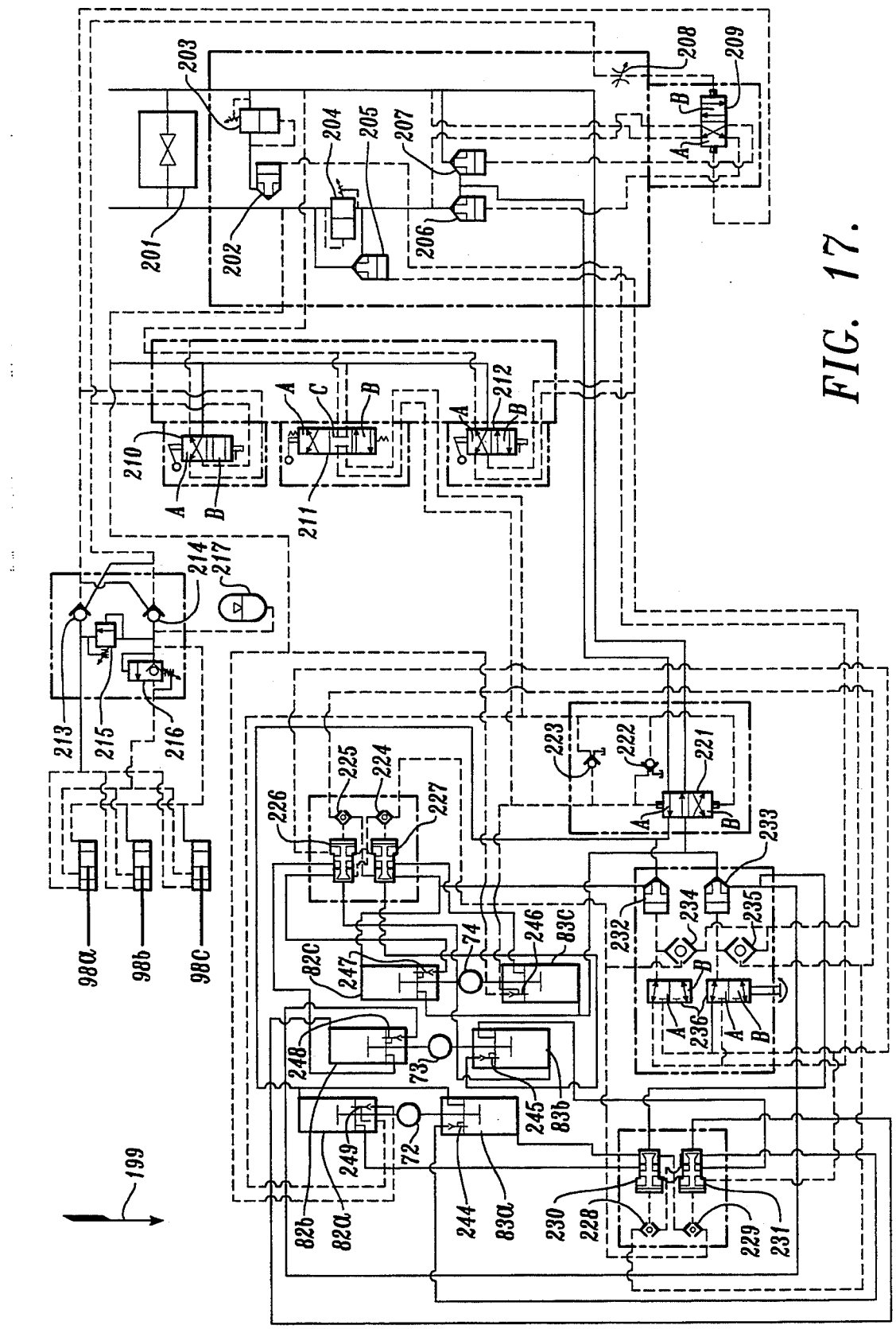
FIG. 17 is a schematic control diagram for the present invention.

FIG. 17 is a schematic control diagram for the drive mechanism of the present invention. Arrow 199 depicts the direction of movement of the drive assemblies 72, 73, 74 in an "unload" direction, wherein cargo carried by the conveyor is unloaded from the conveyor slots. The opposite direction is a "load" direction. Components 201, 210, 211, 212, and 236 are manually controlled. 201 is a manually-controlled ball valve used to "start up" the control system operation. 210 is a two-position, four-way valve for lifting and lowering the lower lift cylinders 98. 211 is a "jog/dead head", three-position four-way, spring-centered valve. Valve 211 is used to override pilots 222,223 of switching valve 221. 212 is a two-position, four-way valve for changing the system pressure from low to high. In the low pressure mode, lift cylinders 98 and drive assembly cylinders 82, 83 are operated to position the drive posts of drive assemblies 72, 73, 74 into the sockets of the transverse drive beams. In the high pressure mode, drive assembly cylinders 82, 83 are operated to reciprocate the conveyor slats of the reciprocating floor conveyor to load and unload cargo thereon. Valve 236 is a rotary-controlled control valve comprising two two-position, three-way valves used to pilot poppets 232, 233. Valve 236 puts the control system in a "load" cycle or "unload" cycle.

The rest of the control system includes pilots 202, 205, 206, 207, 226, 227, 230, 231, 232, 233 for opening and closing poppet valves. Relief valve 203 is set at 1000 psi, as is relief valve 204. Relief valve 215 is set at 3000 psi. The system includes a needle valve 208 and a pilot-operated two-position, four-way valve 209. 213, 214, 222, and 223 are pilots to open check valves. 216 is a relief valve with unrestricted back flow. 217 is an accumulator. 221 is a switching valve. 224, 225, 228, 229, 234, 235 are shuttle valves. 244, 245, 246, 247, 248, and 249 are check valves, with the oil flow of check valve 46 isolated from cylinder 83c and with the oil flow of check valve 49 isolated from cylinder 82a.

To begin the unload operation, the manually-operated valves are placed in the following positions: ball valve 201-open; valve 210 in its lower position with envelope A operative; valve 211 in its spring-centered position, envelope C operative; valve 212 in its low pressure position, envelope A operative; and control valve 236 in its unload position, envelope A operative. A worker then closes ball valve 201 which opens poppet 202. Switching valve 221 is in envelope A. At this point, cylinders 98a–c are retracted with hydraulic pressure applied to the rod end of the cylinder motors. Cylinders 82a–c and 83a–c are inoperative.

A worker then manually shifts valve 210 to its lift position with the valve moved to envelope B. Poppet 206 opens, poppet 207 closes, and needle valve 208 restricts pilot pressure to valve 209, giving a time delay before valve 209 shifts. Valve 209 shifts to envelope B after the time delay via valve 208. Check valve 213 opens while check valve 214 closes. Accumulator 217 charges. Check valves 244, 245 and 248 float open. Cylinders 98a–c extend as hydraulic pressure is applied to the side of the pistons opposite the piston rods. This side of the pistons is referred to as the "blind end" of the pistons. With cylinders 98a–c extended, the drive posts of drive mechanisms 72, 73, 74 are lifted toward the sockets in the transverse drive beams. After a time delay via shifting of control valve 209 in envelope B, hydraulic pressure is applied to the rod end of cylinders 83a–c, causing the cylinders to retract, moving the drive posts toward the discharge or unload end of the reciprocating conveyor floor. At the same time, pressure is applied to the blind end of cylinders 82a–c, causing the cylinders to extend, moving the drive posts of drive mechanisms 72, 73, 74 toward the unload end. Upon reaching full stroke toward the unload end, the piston of cylinder 82a opens check valve 249. This sends pressure to pilot open check 223 and to pilot switching valve 221 into envelope B. Check valve 44 closes, and check valve 47 floats open. This causes the cylinders 83a–c to extend and cylinders 82a–c to retract, moving the drive posts toward the load end of the conveyor floor. Upon reaching full stroke toward the load end, the piston of cylinder 83c opens check valve 246. This sends pressure to pilot open check 222, and pressure to pilot switching valve 221 into envelope A.

Because the system pressure is relatively low, once a drive post has located into the corresponding socket in the transverse drive beam, the cylinders attached to that drive post will stop moving. In the case of drive mechanisms 72 or 74 locating in their respective sockets first, the previous cycle will be halted because the pistons of cylinders 83c and/or 82a will not open check valves 246 and/or 249. If this case occurs, valve 211 is a manually override of the switching valve pilot signal. By moving valve 211 to envelope A, pressure will pilot open check 222 and pilot switching valve 221 to envelope A. By moving valve 211 to envelope B, pressure will pilot open check 223 and pilot switching valve 221 to envelope B. Valve 211 can be used, at any time during system operation, to "jog" the cylinders (change direction of cylinder movement), by moving valve to envelope A or B and releasing. Valve 211 can also be used at any time during system operation, to "dead head" main cylinders to either end of travel by holding valve 211 in either the A or B envelope.

To begin the unload cycle, valve 212 is manually shifted to envelope B, "high pressure" begins unload cycle. Valve 209 is shifted to envelope B. Cylinders 83a–c retract and cylinders 82a–c extend, to move the drive posts of drive assemblies 72, 73, 74 toward the unload end. Cylinders 82a–c and 83a–c move the drive posts toward the unload end until the piston of cylinder 82a opens check valve 249. As check valve 249 opens, pressure pilots open check valve 223 and pilots switching valve 221 to envelope B. Shuttle valves 225 and 228 have blocked pressurized oil therethrough. Cylinders 83b, 83c stop, as do cylinders 82b, 82c. Cylinder 83a extends and cylinder 82a retracts, moving drive post 72 to the load end. Cylinders 83a, 82a move drive post 72 until the piston of cylinder 83a opens check valve 244. Cylinders 83c, 82c remain stopped. Cylinders 83a, 82a, likewise, stop, and cylinder 83b extends while cylinder 82b retracts, moving drive post 73 to the load end. Cylinders 83b, 82b move drive post 73 until the piston of cylinder 83b opens check valve 245. Cylinder 83c then extends while cylinder 82c retracts, moving drive post 74 toward the load end, while cylinders 82a, 82b, 83a, and 83b stop. Cylinders 83c, 82c move drive post 74 until the piston of cylinder 83c opens check valve 246. Pressure from the opening of check valve 246 pilots open check 222 and pilots switching valve 221 to envelope A. The unload cycle then starts again.

To being the load cycle initially, control valve 236 is manually shifted to envelope B, while valve 212 is shifted to envelope B at the appropriate time.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently-described and illustrated embodiment is nonlimitive and is for illustration only. Instead, my patent protection is to be limited only by the following claim or claims interpreted according to accepted doctrines of claim interpretation, including the doctrine of equivalents and reversal of parts.

What is claimed is:

1. A drive mechanism for a reciprocating floor conveyor, comprising:
   a frame including a slat-supporting framework including a first end section, a second end section, a pair of laterally spaced-apart side frame members, and a drive beam window located transversely between the side frame members and longitudinally between the two end sections;
   support beams on the end sections of the framework, for supporting conveyor slats;
   a plurality of elongated conveyor slats mounted adjacent each of the support beams, the conveyor slats being divided into at least two sets, and being movable along the support beams in a first direction for conveying a load and being retractable in an opposite direction;
   a plurality of transverse drive beams within said drive beam window, one for each set of conveyor slats, each transverse drive beam being connected to its set of conveyor slats, each said transverse drive beam having opposite ends and a guide member for each end connected to the drive beam and, directed longitudinally of the conveyor;
   a pair of longitudinal guide and support rails, one on each side of the conveyor, connected to the frame, the rails extending lengthwise of the conveyor and transversely of the drive beams;
   the guide members slidably and guidingly engaging said guide and support rails, whereby during use the transverse drive beams move back and forth longitudinally of the conveyor and the guide and support rails and, as they move, the guide members and the guide and support rails guide the transverse drive beams in their longitudinal travel, causing the two ends of each drive beam to move together, and the transverse drive beams, the guide members, and the guide and support rails transmit to the frame weight that is imposed on the conveyor slats in the region of the drive beam window.

2. A reciprocating slat conveyor according to claim 1, wherein the guide and support rails are elongated beams and the guide members are tubes which surround the elongated beams.

3. A reciprocating slat conveyor according to claim 2, wherein the elongated beams are cylindrical and the guide members are tubular and concentrically surround the elongated cylindrical beams.

4. A reciprocating slat conveyor according to claim 3, further including a low friction material between the tubular guide member and the elongated cylindrical beams.

5. A reciprocating conveyor, comprising:
   a lower frame;
   an upper frame connectable to and removable from the lower frame;
   a plurality of longitudinal conveyor slats carried by the upper frame, the conveyor slats being divided into a plurality of sets, each set including a transverse drive beam below the set, to which each slat of the set is connected;
   a plurality of drive units, one for each transverse drive beam, said drive units being mounted on the lower frame and each including,
   a drive post having an upper end,
   a drive member at the upper end of the drive post engageable with an associated transverse drive beam;
   a vertically adjustable lift mechanism for moving the drive post between a down position in which the drive member is separate from the associated transverse drive beam, and an up position in which the drive member drivingly engages the associated transverse drive beam;
   a forward piston-cylinder motor positioned forwardly of the drive post and having one end pivotally connected to the lower frame and another end pivotally connected to an upper portion of the drive post,
   a rearward piston-cylinder motor positioned rearwardly of the drive post and having a cylinder end pivotally connected to the lower frame and a rod end pivotally connected to an upper portion of the drive post,
   said piston-cylinder motors, when in the up position, each sloping upwardly from its connection to the frame to its connection with a drive post;
   and each piston-cylinder motor having a large area lower working chamber and a small area upper working chamber; and
   wherein during use fluid pressure is introduced into the lower working chamber and removed from the upper working chamber of a first of the piston-cylinder motors, so that such first piston-cylinder motor will push on the drive post, and fluid pressure is introduced into the upper working chamber and removed from the lower working chamber of the second piston-cylinder motor, so that such second piston-cylinder motor will pull on the drive post, and wherein the fluid pressure acting on the large area lower working chamber will provide a differential vertical force acting on the drive post to urge it upwardly into engagement with its transverse drive beam.

6. The reciprocating slat conveyor of claim 5, wherein the upper frame includes a lower boundary, the lower frame has an upper boundary, and each transverse drive beam includes a lower boundary that is no lower than the lower boundary of the upper frame.

7. The reciprocating slat conveyor of claim 6, wherein the drive post, in its down position, is positioned below both the lower boundary of the upper frame and the upper boundary of the lower frame.

8. The reciprocating slat conveyor of claim 5, wherein the transverse drive beam includes a socket portion for receiving the drive member of the drive post and a pair of angled surfaces that face downwardly and toward each other and abut the socket portion of the transverse drive beam, whereby, when the upper frame is mounted onto the lower frame, if the drive post and socket portion are not vertically aligned, the drive post will contact an angled surface upon being raised and be guided toward the socket portion.

9. A reciprocating slat conveyor including a plurality of conveyor slats and a drive mechanism for reciprocating the conveyor slats longitudinally along the conveyor, comprising
   an elongated conveyor frame including a pair of laterally-spaced side frame members,
   support beams mounted on the frame for supporting the conveyor slats,
   one conveyor slat being mounted adjacent each support beam, the conveyor slats being divided into at least two sets and being movable along the support beams in a first direction for conveying a load and being retractable in an opposite direction, a transverse drive beam for each set of conveyor slats, each transverse drive beam being connected to its set of conveyor slats and to the drive mechanism, and a guide mechanism on the frame for restraining the transverse drive beams to linear movement longitudinally along the conveyor, the guide mechanism including a guide member mounted to each side frame member of the conveyor frame and coupled to an end portion of each transverse drive beam.

10. The reciprocating slat conveyor of claim 9, wherein the guide members comprise a guide beam and the end portions of the transverse drive beams include a sleeve that surrounds the guide beam and is slidably movable therealong.

11. The reciprocating slat conveyor of claim 10, wherein the sleeves are cylindrical in shape and the guide beam is circular in cross-section.

12. The reciprocating slat conveyor of claim 10, and further comprising a bearing surface mounted between the sleeve and the guide beam.

* * * * *